United States Patent [19]
Koss

[11] Patent Number: 5,272,628
[45] Date of Patent: Dec. 21, 1993

[54] METHOD AND SYSTEM FOR AGGREGATING TABLES HAVING DISSIMILAR FORMATS

[75] Inventor: Michael C. Koss, Bothell, Wash.

[73] Assignee: Microsoft Corporation, Redmond, Wash.

[21] Appl. No.: 509,470

[22] Filed: Apr. 16, 1990

[51] Int. Cl.⁵ .................. G06F 15/38; G06F 15/00
[52] U.S. Cl. .................. 364/419.19; 395/146; 395/600
[58] Field of Search .............. 364/419, 523, 900, 518, 364/408, 200; 395/148, 161, 375, 146, 148, 156, 157

[56] References Cited

U.S. PATENT DOCUMENTS

| | | | |
|---|---|---|---|
| 4,644,471 | 2/1987 | Kojima et al. | 364/300 |
| 5,021,995 | 6/1991 | Quint et al. | 364/900 |
| 5,033,009 | 6/1991 | Dubnoff | 364/523 |

*Primary Examiner*—Roy N. Envall, Jr.
*Assistant Examiner*—Khai Tran
*Attorney, Agent, or Firm*—Seed and Berry

[57] ABSTRACT

The present invention contemplates a method and system for automatically aggregating tables having a variety of configurations or layouts into a single destination table. Specifically, tables having a variety of categories with multiple divisions within those categories may be combined wherein rows and columns are automatically created in a destination table based on the categories and divisions of one or more source tables. In accordance with the teachings of the present invention, a plurality of source tables are selected as input to the system. A template containing categories and divisions for aggregation is then manually generated by a user or automatically generated by the computer system based on the categories and divisions contained within the source tables. Once the template is generated, mapping tables for rows and columns are created wherein each mapping table comprises an array of pairs of values wherein each pair comprises a first value for identifying a source table location and a second value for identifying a template location. The system then generates a single destination table by applying the mapping tables and by performing the desired mathematical function on the values in the source and destination tables (e.g., summing the values in the appropriate locations in the source and destination tables).

17 Claims, 5 Drawing Sheets

|  | $T_i[0,1]$ | $T_i[0,2]$ | $T_i[0,3]$ |
|---|---|---|---|
| $T_i[1,0]$ | $T_i[1,1]$ | $T_i[1,2]$ | $T_i[1,3]$ |
| $T_i[2,0]$ | $T_i[2,1]$ | $T_i[2,2]$ | $T_i[2,3]$ |
| $T_i[3,0]$ | $T_i[3,1]$ | $T_i[3,2]$ | $T_i[3,3]$ |

*Figure 5*

METHOD AND SYSTEM FOR AGGREGATING TABLES HAVING DISSIMILAR FORMATS

DESCRIPTION

1. Technical Field

This invention relates to the field of computer application programs and more specifically to a method and means for combining the data contained in a number of tables having dissimilar formats.

2. Background of the Invention

Computer spreadsheet applications are a popular means of relating a large amount of numerical data with predetermined mathematical relationships. Specifically, a spreadsheet typically comprises a plurality of cells, arranged in rows and columns wherein each cell is identified by its X-Y position in the spreadsheet and further wherein data within the cell may be manipulated or processed according to its relative position with respect to other cells. In addition to two dimensional arrays, some spreadsheets may include other planes for associating cells, thus providing a spreadsheet structure having three or more dimensions.

Groups of cells within a spreadsheet which may be logically grouped may be thought of as a table wherein a single spreadsheet may contain multiple tables. In other words, a table may comprise a portion of a spreadsheet. In addition, a table may exist in a static form such as a table which comprises a portion of a word processing document.

Occasionally, it is desirable to combine the data contained in multiple tables into a single master table. Prior spreadsheet application programs have provided only limited capability for table aggregation wherein only source tables having identical formats, in terms of size and category designations, could be combined. No technique is known which allows any number of tables having virtually any configuration to be automatically combined.

SUMMARY AND OBJECTS OF THE INVENTION

Accordingly, it is an object of the present invention to provide a method and system for aggregating tables having dissimilar formats.

It is another object of the present invention to provide a method and system for aggregating tables based on specific categories of information.

It is still another object of the present invention to provide a method and system for aggregating tables based on generic categories of information.

In summary, the present invention contemplates a method and system for automatically aggregating tables having a variety of configurations or layouts. Specifically, tables having a variety of categories with multiple divisions within those categories may be combined wherein rows and columns are automatically created in a destination table based on the categories and divisions of one or more source tables. In accordance with the teachings of the present invention, a plurality of source tables are selected as input to the system. Categories for aggregation are then specified by a user or are automatically generated based on the categories contained within the source tables. Once the desired categories are specified, mapping tables for rows and columns are created wherein each mapping table comprises an array of pairs of values wherein each pair comprises a first value for identifying a source table location and a second value for identifying a destination table location. The system then conducts a binary search based on each pair in the mapping table to find the correct location in the destination table and to apply the desired table mapping by performing the desired mathematical function on the values in the source and destination tables (e.g., summing the values in the appropriate locations in the source and destination tables).

BRIEF DESCRIPTION OF THE DRAWINGS

These and other objects may be completely understood through the detailed description of the invention below and the accompanying drawings in which.

DETAILED DESCRIPTION OF THE INVENTION

Figure 1:
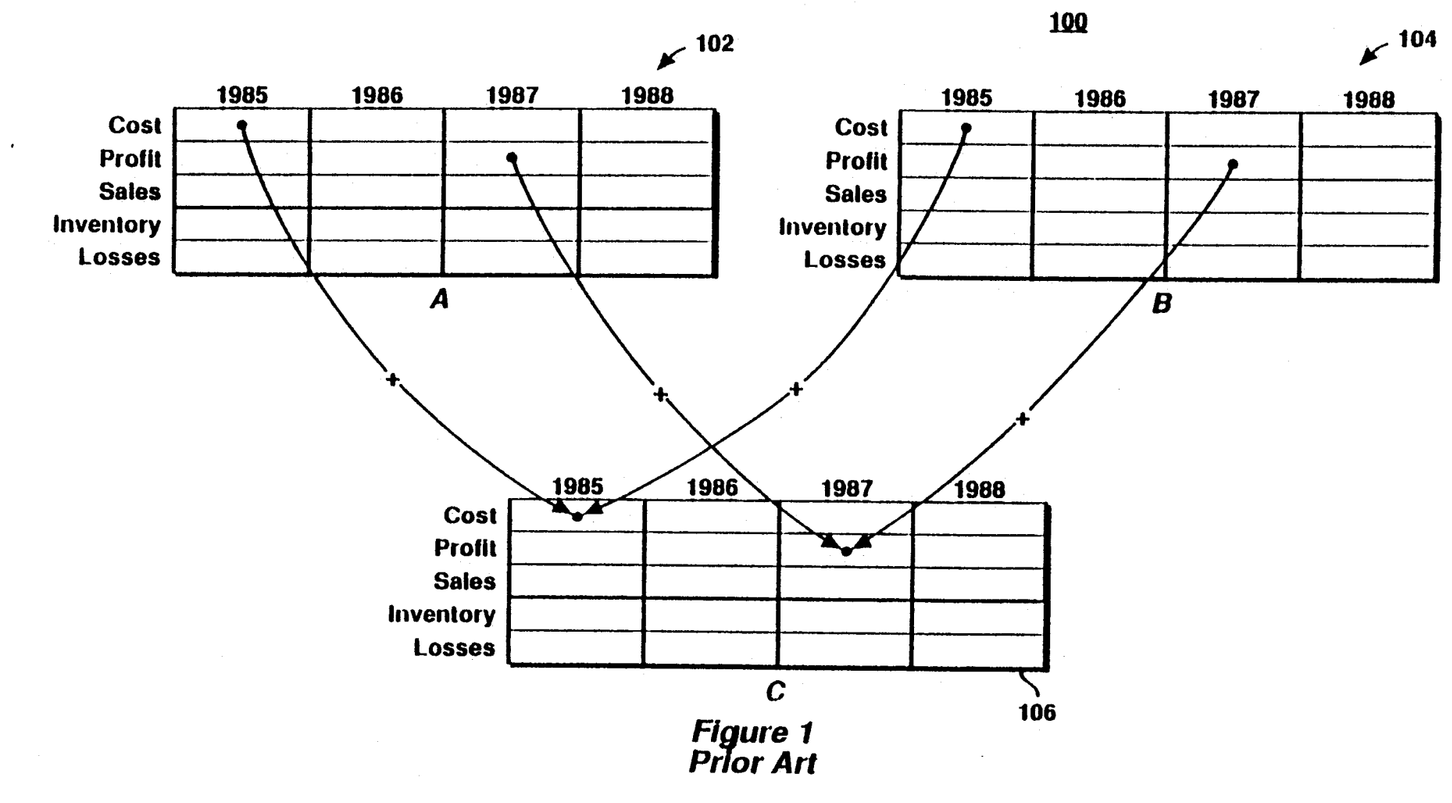
FIG. 1 is a diagram showing a prior aggregation technique.

The present invention contemplates a method and system which allows the consolidation or aggregation of data in disparate tables into a single aggregate table which summarizes that data. While the present invention is adapted for aggregating virtually any type of table, in the discussion below, spreadsheets are shown as an example of one application of this invention. As shown in FIG. 1, in prior systems, only spreadsheets having identical configurations could be combined. The example of FIG. 1 demonstrates the aggregation capabilities of the popular Lotus 1-2-3 spreadsheet application program available from Lotus Development Corp. In the system 100, source spreadsheets 102, 104 represent typical spreadsheets wherein various categories are arranged along the vertical axis and various divisions are aligned along the horizontal axis of the spreadsheet, thus forming a plurality of cells arranged in rows and columns. In the example of system 100, financial categories are aligned along the vertical axis of the spreadsheets 102, 104 and yearly divisions are aligned along the horizontal axis of the spreadsheet.

In the system 100, source spreadsheets 102, 104 may be aggregated into an aggregate spreadsheet 106 which must be the same configuration as source spreadsheets 102, 104 wherein an identical number of rows and columns must be used with identical categories and divisions aligned along each vertical and horizontal axis, respectively.

Figure 2:
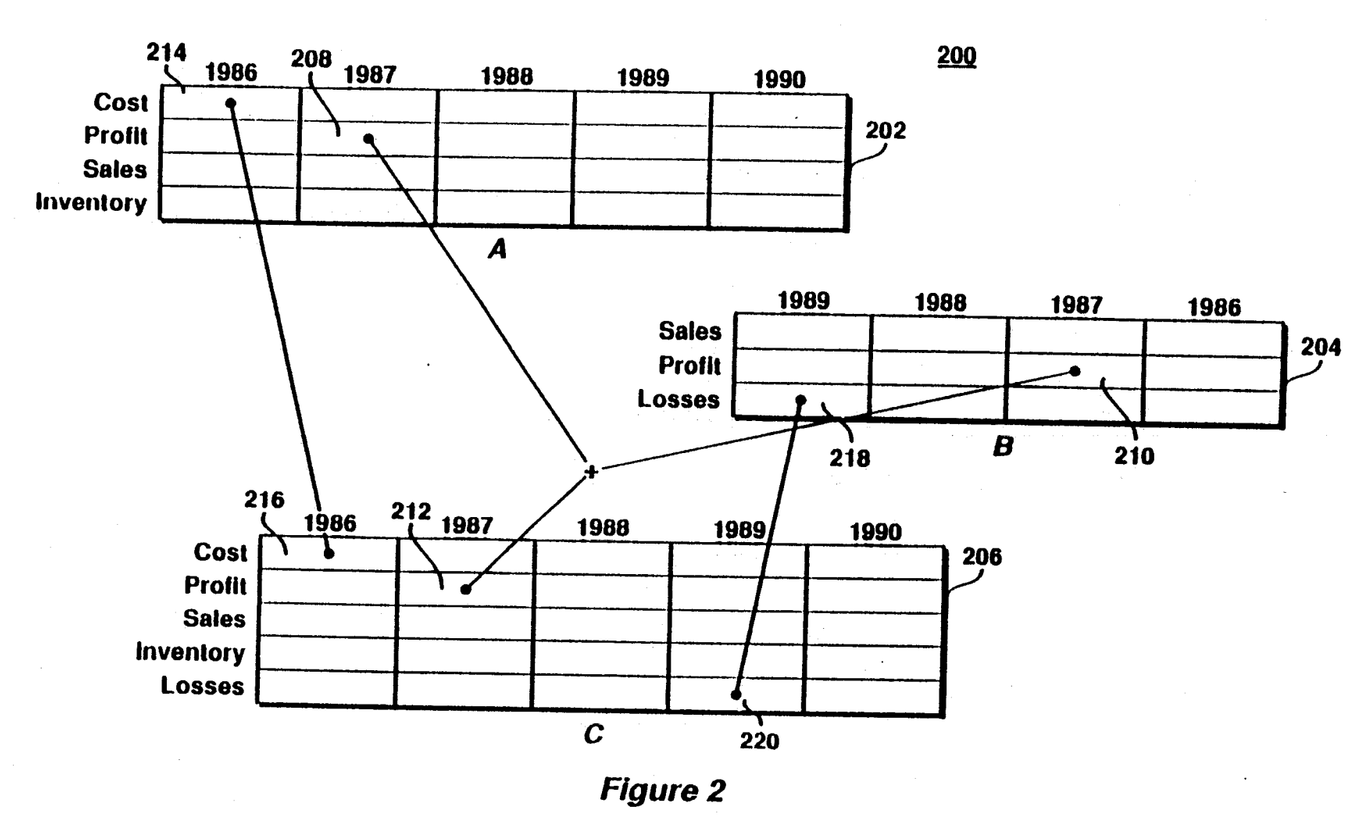
FIG. 2 is a diagram showing the aggregation of spreadsheets having dissimilar formats.

In contrast, the present invention provides an improved method and system wherein source tables of virtually any size and configuration may be combined in an aggregate table based on user-defined, or automatically generated criteria. Referring now to FIG. 2, in a first aspect of the present invention, the source spreadsheets 202, 204 may be combined into a destination spreadsheet 206 wherein the source spreadsheets 202, 204 may contain a different number of rows and columns having different category and division designations. For example, spreadsheet 202 may contain the financial categories "Cost", "Profit", "Sales" and "Inventory" aligned along the vertical axis with divisions for the years 1986-1990 aligned along the horizontal axis in ascending order; and spreadsheet 204 may contain the financial categories "Sales", "Profit" and "Losses" aligned along the vertical axis with divisions for the years 1989-1986 aligned along the horizontal axis in descending order.

The present invention provides a method and means for automatically aggregating source spreadsheets 202, 204 to generate a destination spreadsheet 206 having all of the categories and divisions of both spreadsheets 202, 204. This aspect of the present invention is referred to as dynamic aggregation. In the system 200, the respective fields of the source spreadsheets 202, 204 may be combined according to predefined relationships such as summing, subtracting, etc., as represented by fields 208, 210 which are summed to generate field 212. In cases wherein there are no common categories between source spreadsheets, new fields are created in the destination spreadsheet 206 as represented by fields 214, 216 and fields 218, 220, respectively.

Figure 3:
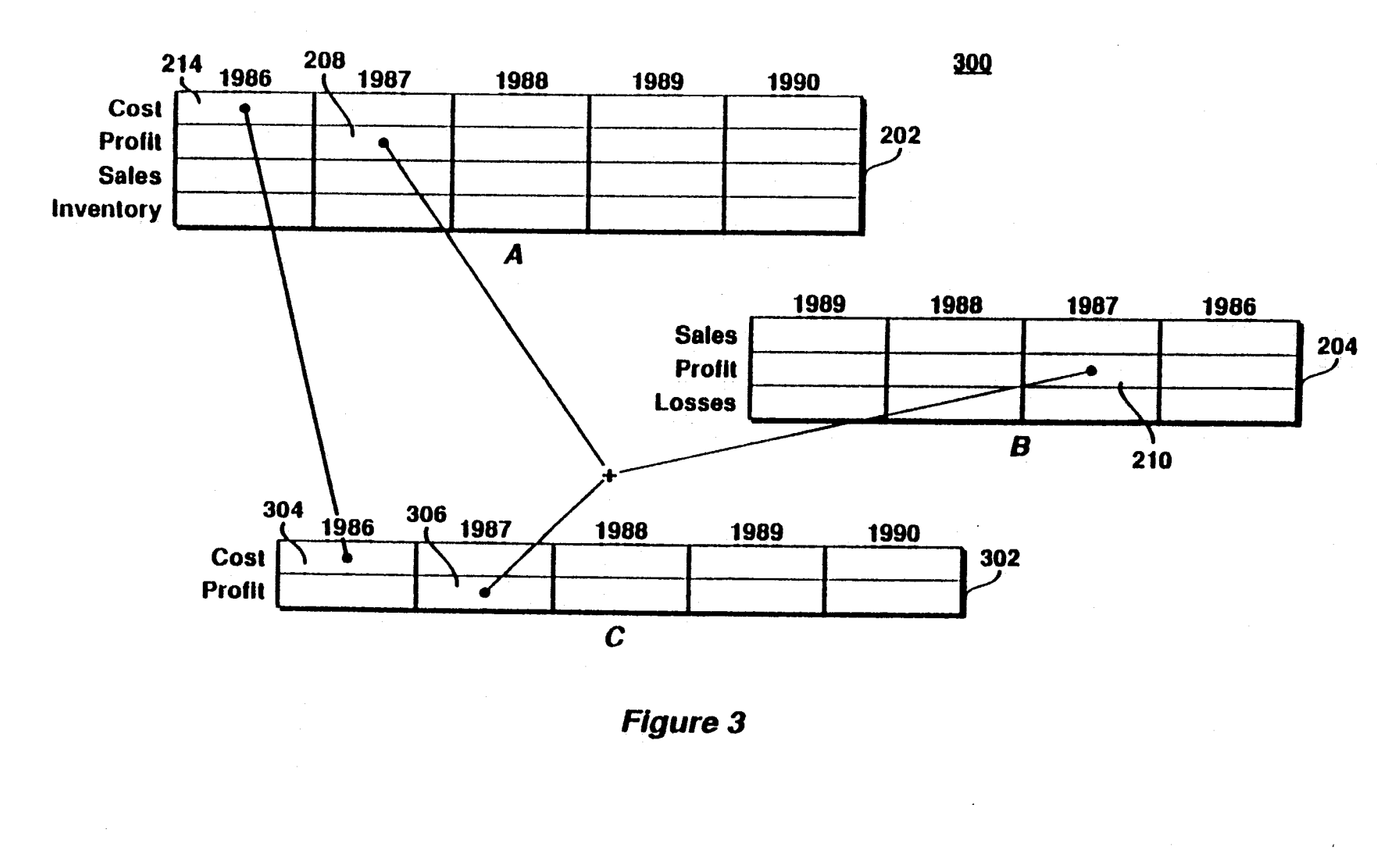
FIG. 3 is a diagram showing the automatic aggregation of multiple spreadsheets based on specific categories of information.

In another aspect of the present invention, referred to as static aggregation and shown in FIG. 3, specific fields may be specified by the user for aggregating in the destination spreadsheet 302. For example, in the system 300, source spreadsheets 202, 204 described above are used to generate aggregate spreadsheet 302 which contains aggregates of the "Cost" and "Profit" fields of spreadsheet 202 and the "Profit" fields of spreadsheet 204. In this example, exemplary source fields 208 and 210 of spreadsheets 202, 204, respectively, may be summed to create destination field 306 and the cost fields, e.g., cost field 214, are directly copied into aggregate spreadsheet 302 to generate new cost fields, e.g. cost field 304.

Figure 4:
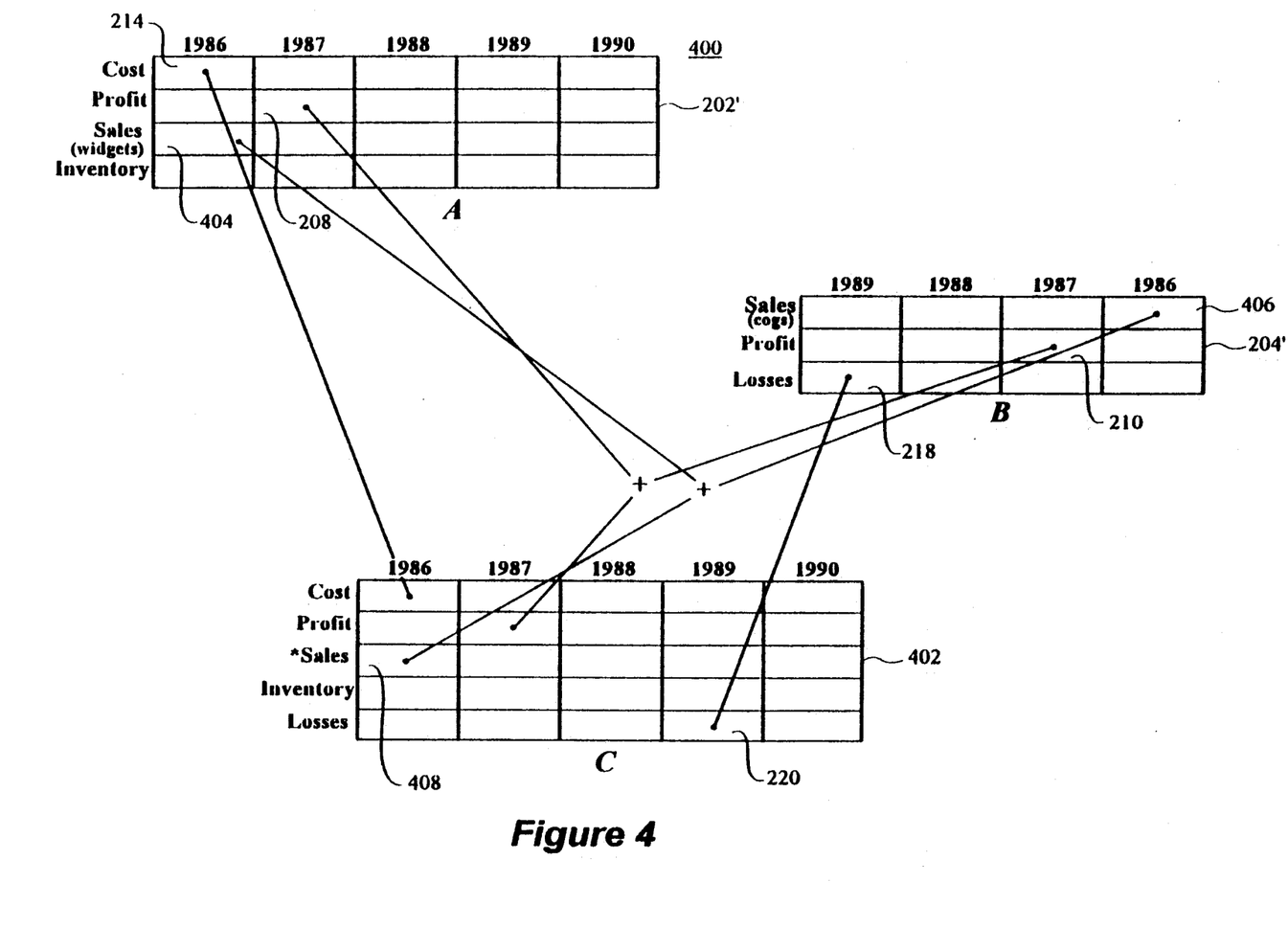
FIG. 4 is a diagram showing the aggregation of spreadsheets based on generic categories of information in accordance with the teachings of the present invention.

In the above examples, the respective aggregate spreadsheets are generated from source spreadsheets having nonvariant or specific categories, or categories for only one type of item. In another aspect of the present invention, the present invention contemplates a method and system for aggregating spreadsheets having generic categories of information. Referring now to FIG. 4, the spreadsheets 202' and 204' are similar to the spreadsheets 202, 204 with the exception that the "Sales" fields have been modified. For example, sales field 404 has been modified to represent sales of "widgets" for 1986 and sales field 406 has been modified to represent sales of "cogs" for 1986. Accordingly, in addition to all of the features described above, the present invention contemplates a method and system wherein a generic aggregate field may be defined, such as field 408, which represents total sales for both widgets and cogs for 1986.

According to the principles of the present invention, inputs to the inventive aggregation system comprise a list of input tables and an optional output table template which may be specified by a user. If no output table template is specified, one is generated by scanning all of the input tables and including each unique category and division found in the input tables. This is performed for each axis.

Figure 5:
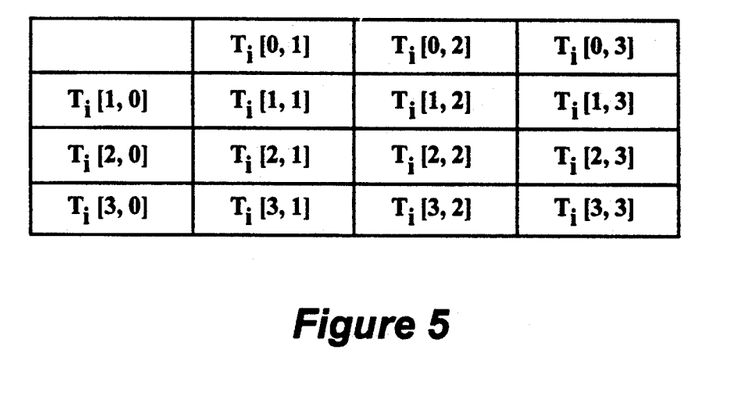
FIG. 5 is a diagram of a table demonstrating the cell location identifying convention used in the operation of the present invention.

Referring now to FIG. 5, according to the principles of the present invention, input data is generated in the form of a list of tables designated:

$$T = \{T_1, T_2, ..., T_N\}$$

where N is the total number of input tables given.

The value of a particular element (or entry) of a table is represented in the form:

$$T_i[j,k]$$

where $T_i$ is the $i^{th}$ table in the input list, j is the row number and k is the column number of the table entry. The number of data rows and columns contained in table $T_i$ is indicated by $r_i$ and $c_i$, respectively. The category and division elements are treated as special table entries with 0-value indices. A table incorporating the above convention is shown in FIG. 5.

An output table template (either automatically generated or specified by a user), is referred to as O, each element being listed as $O[i,j]$. In the preferred practice of the present invention, the output table template is initialized wherein all data values are set to zero and all unique categories and divisions are stored in the elements $O[i,0]$, and $O[0,j]$, respectively. The maximum data row and column of the output table is designated $r_O$ and $c_O$.

The GenerateTable function is used to automatically generate an output table template:

```
GenerateTable({T1, T2, ..., TN}, O)
{
    for each table, Ti∈{T1, T2, ..., TN}
    {
        for rin = 1 to ri
        {
            for rout = 1 to ro
                if T[rin, 0] == O[rout, 0]
                    goto RowFound;
            ro++;
            O[ro, 0] = T[rin, 0];
RowFound:
        }
        for cin = 1 to ci
        {
            for cout = 1 to co
                if T[0, cin] == O[0, cout]
                    goto ColFound;
            co++;
            O[0, co] = T[0, cin];
ColFound:
        }
    }
}
```

A subtable is referred to with index ranges instead of scalar constants. For example, while an entire output table may be referred to by O, a data area may be designated as follows:

$$O[1..r_O, 1..c_O]$$

The vector of row categories is specified as follows:

$$O[1..r_O, 0]$$

In the preferred practice of the present invention, a mapping list is used to map source table row and columns to corresponding destination output (or aggregate) table row and columns. A mapping list is written as a list of pairs $M = \{(s_1, d_1), (s_2, d_2), ... (s_i, d_i)\}$ where each $s_i$ represents a source row or column and each $d_i$ represents a destination row or column (a mapping list contains either all source and destination row numbers or all source and destination column numbers, but not both).

The mapping process of the present invention is defined by the pseudo code DataConsolidate listing below which is set forth in the syntax of the well known "C" programming language. The following algorithm receives as input two arguments: an input table list and an output table template (which may be automatically generated by the GenerateTable subroutine or specified by a user), specified with the element identification convention set forth above.

```
DataConsolidate({T_1, T_2, ..., T_N}, O)
{
    for each table, T_t ∈ {T_1, T_2, ..., T_N}
    {
        M_r = Map(O[1 ... r_o, 0], T_t[1 ... r_t, 0]);
        M_c = Map(O[0, 1 ... c_o], T_t[0, 1 ... c_t]);
        for each pair, (s_r, d_r), in M_r
            for each pair, (s_c, d_c), in M_c
                Apply(O, T_t[s_r, s_c], d_r, d_c);
    }
    ComputeStats(O);
}
```

The map subroutine called by DataConsolidate is used to create a mapping list from a source and a destination category vector and from a source and destination division vector. Instead of performing an equality comparison to locate matching categories and matching divisions, the output table uses categories and divisions as a pattern to match against all categories and divisions in a source table. A pseudo code listing for the map subroutine is set forth below:

```
Map(V_o, V_i)
{
    NewMap(M);  //Create a new empty mapping list
    for o = 1 to |V_o|
        for i = 1 to |V_i|
            if(PatternMatch(V_o[o], V_i[i]))
                AddToMap((i, o), M);
    return(M);
}
```

A PatternMatch subroutine receives as input arguments:
(1) a pattern string
(2) an object string.

If the pattern string contains no wild-card characters (used for generic aggregation), PatternMatch returns true if the pattern and object string are identical. Otherwise, PatternMatch returns true if the pattern string can be made to be identical to the object string after substituting a '?' character in the pattern for any other single character, and an '*' character in the pattern for any zero or more characters. For example, the pattern string "c?t" would match an object string of "cat", and "*Sales" would match "Regional Sales". A specific implementation for the PatternMatch routine is not set forth herein. However, a PatternMatch routine suitable for use with the present invention is set forth in Chapter 9, Aho, Hopcroft, and Ullman, "The Design and Analysis of Computer Algorithms," 1974 and published by Addison-Wesley.

The AddToMap subroutine called by the Map subroutine adds the first argument (a pair of numbers) to the second argument mapping list. It ensures that each pair is added only once to M (i.e., only unique pairs are allowed with no duplicates).

```
AddToMap is coded as follows:
NewMap(M)
{
    /* For simplicity, assume a large fixed allocation, k. In practice,
       we use dynamic re-allocation of the array as it grows. */
    M.Array = AllocateArray(k);
    M.size = 0;
}
AddToMap((i, o), M)
{
    /* Binary search */
    iMin = 0;
    iMid = 0;
    iMac = M.size;
    while (iMin != iMac)
    {
        iMid = iMin + (iMac-iMin)/2;
        sgn = ComparePair(M.Array[iMid], (i, o));
        /* Pair already in array, return */
        if (sgn == 0)
            return;
        /* Too low, look in upper interval */
        if (sgn < 0)
            iMin = iMid+1;
        /* Too high, look in lower interval */
        else
            iMac = iMid;
    }
    /* Not found, insert new pair at iMid position in array */
    /* Move all pairs above the new pair up by one */
    M.size++;
    for i = M.size to iMid+1 step -1
        M.Array[i] = M.Array[i-1]
    M.Array[iMid] = (i, o);
}
ComparePair((i_1, o_1), (i_2, o_2))
{
    if(i_1!=i_2)
```

```
            return(i₁-i₂)
        else
            return(o₁-o₂);
}
    An apply function adds the applied value to the
corresponding element of the output table. A pseudo code
listing for the apply function is set forth below:
    Apply(O, val, r, c)
    {
        O[r, c] + = val;
    }
    ComputeStats(O)    /* This function need do no work to compute a sum */
{
}
```

While the above description was set forth in terms of additive mapping, the present invention may be used for aggregate functions other than summing with a small modification. For example, rather than the Apply subroutine adding entries directly to the output table O, the routine enters intermediate values into a set of temporary tables of the same dimension as O. For example, to average values, two tables can be used, one for holding a cumulative sum, and one to contain the count of elements contributing to the sum. In this embodiment, the DataConsolidate routine is modified to include a step which combines the intermediate values from the temporary tables such that each element in O is assigned to the quotient of the sum table divided by the value in the count table. Similarly, a statistical variance function may be implemented through the use of three tables, a sum table, a sum of squares table and a count table. These features may be implemented according to the routine set forth below:

```
    Apply(O, val, r, c)    /* Version of Apply to compute Average */
    {
        Count[r, c]++;
        O[r, c] + = val;
    }
    ComputeStats(O)
    {
        for r = 1 to r_o
            for c = 1 to c_o
                if(Count[r, c] != 0)
                    O[r, c]/ = Count[r, c];
    }
Similarly, a statistical VARIANCE function can be computed by using three
temporary tables, a sum, and sum of squares, and a count.
    Apply(O, val, r, c)
    {
        Count[r, c]++;
        O[r, c] + = val;
        SumSq[r, c] + = val²;
    }
    ComputeStats(O)
    {
        for r = 1 to r_o
            for c = 1 to c_o
                if(Count[r, c] != 0)
                    O[r, c] = Count[r, c]*SumSq[r, c] - O[r, c]²)/Count[r,
c];
```

In summary, an improved method for aggregating tables having dissimilar formats has been described. Accordingly, all of such uses and modifications will be apparent to persons of ordinary skill without departing from the spirit and scope of the appended claims.

I claim:

1. A method for aggregating tables in a computer system running a program, wherein the program uses tables to store and manipulate data, each table consisting of a grid of intersecting rows and columns, and where each column has a heading called a division and each row has a heading called a category, said method comprising the steps of:
   (a) specifying a plurality of source tables for aggregation, each source table having at least one category and division;
   (b) generating a destination table template, said destination table template specifying desired categories and divisions of said source tables to be aggregated into a destination table;
   (c) creating a category mapping list that maps categories of said source tables to corresponding categories of said destination table template;
   (d) creating a division mapping list that maps divisions of said source tables to corresponding divisions of said destination table template; and
   (e) applying the category mapping list and the division mapping list to said destination table.

2. The method of claim 1 wherein said destination table template is manually generated by a user.

3. The method of claim 1 wherein said destination table template is automatically generated by the computer system.

4. A computer system for aggregating tables, the computer system running a program, the program using tables to store and manipulate data, each table consisting of a grid of intersecting rows and columns, each column having a heading called a division and each row having a heading called a category, the system comprising:
- (a) input means for specifying a plurality of source tables for aggregation, each source table having at least one category and division;
- (b) means for generating a destination table template, said destination table template specifying desired categories and divisions of said source tables to be aggregated into a destination table;
- (c) means for creating a category mapping list that maps categories of said source tables to corresponding categories of said destination table template;
- (d) means for creating a division mapping list that maps divisions of said source tables to corresponding divisions of said destination table template; and
- (e) means for applying the category mapping list and the division mapping list to said destination table.

5. A computer system for aggregating tables, each table having an intersecting grid of rows and columns and each table having a format defined by the rows and columns in the table, the system comprising:
- (a) a plurality of source tables for storing data, at least one of said source tables having a different format than other source tables;
- (b) a destination table template for specifying the rows and columns from said source tables to be aggregated; and
- (c) means for aggregating said source tables into a destination table, the destination table having the same format as the destination table template.

6. The system of claim 5 wherein the data stored in cells is numeric data.

7. A method for combining tables in a computer system running a program, wherein the program uses tables to store data, wherein each table contains a grid of intersecting columns and rows, wherein the intersection of each column and row is a cell capable of containing data, said method comprising the steps of:
specifying a plurality of source tables to be combined such that each source table column has a heading called a division and each source table row has a heading called a category and at least one source table has a different format than other source tables; and
generating a destination table, the destination table containing divisions and categories from the source tables in addition to data that is derived from data contained in cells form the source tables.

8. The method of claim 7 wherein the destination table contains the union of the divisions and categories of the source tables.

9. The method of claim 7 wherein the cells of the destination table contain data that are the result of a mathematical operation on the data from the corresponding cells in the source tables.

10. The method of claim 7 wherein the step of generating a destination table includes the additional steps of:
generating a destination table template containing selected divisions and categories from the source tables;
generating a mapping between the source tables and the destination table template; and
generating the destination table based on the mapping between the source tables and the destination table template.

11. The method of claim 10 wherein the destination table template contains user-selected divisions and categories.

12. The method of claim 10 wherein the destination table template contains divisions and categories automatically selected by the computer system.

13. The method of claim 10 wherein the step of generating a mapping includes the additional step of creating destination mapping tables that map the relationship of the source table categories to the destination table template categories and the source table divisions to the destination table template divisions.

14. A method for aggregating a plurality of disparate source tables into a destination table in a computer system running a program, wherein the program uses the plurality of disparate source tables to store and manipulate data, wherein each table contains a grid of intersecting columns and rows, wherein each column contains a column label and data, and each row contains a row label and data, the method comprising the steps of:
- a) selecting the plurality of source tables, each source table comprising at least one column label and at least one row label;
- b) determining which column and row labels from the plurality of source tables will be represented within the destination table; and
- c) for each source table,
    creating a column mapping list, the mapping list containing a list of paired entries ($s_c, d_c$), each $s_c$ representing a source table column label and each $d_c$ representing a destination table column label such that the data in the represented source table column will be stored in the represented destination table column,
    creating a row mapping list, the row mapping list containing a list of paired entries ($s_r, d_r$), each $s_r$ representing a source table row label and each $d_r$ representing a destination table row label such that the data in the represented source table row will be stored in the represented destination table row, and
    adding data from the source table to the destination table in accordance with the column and row mapping lists, the column and row mapping lists supplying the correct destination column $d_c$ and destination row $d_r$ for storing data contained within a source table column $s_c$ and source table row $s_r$.

15. The method of claim 14 wherein the step of determining which column and row labels from the plurality of source tables will be represented within the destination table includes receiving input from a user of the computer system regarding desired column and row labels.

16. The method of claim 14 wherein the step of determining which column and row labels from the plurality of source tables will be represented within the destination table includes the step of including a row label in the destination table for each unique row label in the plurality of source tables and including a column label in the destination table for each unique column label in the plurality of source tables.

17. The method of claim 14 wherein the step of adding data from the source table to the destination table includes the steps of:
for each paired entry ($s_c$, $d_c$) in the column mapping list,
for each paired entry ($s_r, d_r$) in the row mapping list, adding the data stored at the intersection of the row containing row label $s_r$ and the column containing column label $s_c$ in the source table to the data stored at the intersection of the row containing row label $d_r$ and the column containing column label $d_c$ in the destination table.

* * * * *